(12) United States Patent
Colgrove et al.

(10) Patent No.: US 6,910,111 B1
(45) Date of Patent: Jun. 21, 2005

(54) VOLUME RESTORATION USING AN ACCUMULATOR MAP

(75) Inventors: John A. Colgrove, Los Altos, CA (US); Oleg Kiselev, Palo Alto, CA (US)

(73) Assignee: Veritas Operating Corporation, Mountain View, CA (US)

( * ) Notice: Subject to any disclaimer, the term of this patent is extended or adjusted under 35 U.S.C. 154(b) by 274 days.

(21) Appl. No.: 10/324,811

(22) Filed: Dec. 20, 2002

(51) Int. Cl.$^7$ .............................................. G06F 12/00
(52) U.S. Cl. ...................................... 711/162; 707/204
(58) Field of Search ..................... 711/161–162, 156; 714/4; 707/204

(56) References Cited

U.S. PATENT DOCUMENTS

| | | | |
|---|---|---|---|
| 5,155,824 A | 10/1992 | Edenfield et al. | 711/143 |
| 5,497,483 A | 3/1996 | Beardsley et al. | 714/1 |
| 5,506,580 A | 4/1996 | Whiting et al. | 341/51 |
| 5,532,694 A | 7/1996 | Mayers et al. | 341/67 |
| 5,574,874 A | 11/1996 | Jones et al. | 712/200 |
| 5,649,152 A | 7/1997 | Ohran et al. | 711/114 |
| 5,778,395 A | 7/1998 | Whiting et al. | 707/204 |
| 5,835,953 A | 11/1998 | Ohran | 711/162 |
| 5,907,672 A | 5/1999 | Matze et al. | 714/8 |
| 6,073,222 A | 6/2000 | Ohran | 711/162 |
| 6,085,298 A | 7/2000 | Ohran | 711/162 |
| 6,141,734 A | 10/2000 | Razdan et al. | 711/144 |
| 6,189,079 B1 | 2/2001 | Micka et al. | 711/162 |
| 6,282,610 B1 | 8/2001 | Bergsten | 711/114 |
| 6,341,341 B1 | 1/2002 | Grummon et al. | 711/162 |
| 6,353,878 B1 | 3/2002 | Dunham | 711/162 |
| 6,434,681 B1 | 8/2002 | Armangau | 711/162 |
| 6,460,054 B1 | 10/2002 | Grummon | 707/204 |
| 6,564,301 B1 | 5/2003 | Middleton | 711/144 |
| 6,591,351 B1 | 7/2003 | Urabe et al. | 711/162 |
| 2003/0041220 A1 | 2/2003 | Peleska | 711/162 |

*Primary Examiner*—Nasser Moazzami
(74) *Attorney, Agent, or Firm*—Campbell Stephenson Ascolese LLP

(57) ABSTRACT

In a process to restore a data volume in a first memory, a virtual point-in-time (PIT) copy of the data volume is created. Creating the virtual PIT copy includes creating first, second and third maps in memory. Each of the first, second, and third maps includes a plurality of multi-bit entries. Each of the entries of the first and second maps corresponds to a respective memory region of the first memory, while each of the entries of the third map corresponds to a respective memory region of a second memory for storing data of the virtual PIT copy.

22 Claims, 14 Drawing Sheets

| n | $V_n$ | $M_n$ |
|---|---|---|
| 1 | 1 | 0 |
| 2 | 1 | 0 |
| 3 | 1 | 1 |
| 4 | 1 | 0 |
| ⋮ | | |
| $n_{max}$ | 1 | 0 |

26

| n | $V_n$ | $M_n$ |
|---|---|---|
| 1 | 1 | 1 |
| 2 | 1 | 1 |
| 3 | 1 | 0 |
| 4 | 1 | 0 |
| ⋮ | | |
| $n_{max}$ | 1 | 0 |

30(1)

| n | $V_n$ | $M_n$ |
|---|---|---|
| 1 | 1 | 0 |
| 2 | 1 | 0 |
| 3 | 1 | 0 |
| 4 | 0 | 0 |
| ⋮ | | |
| $n_{max}$ | 0 | 0 |

32(1)

| n | $V_n$ | $M_n$ |
|---|---|---|
| 1 | 1 | 0 |
| 2 | 1 | 1 |
| 3 | 1 | 0 |
| 4 | 1 | 0 |
| ⋮ | | |
| $n_{max}$ | 1 | 0 |

30(2)

| n | $V_n$ | $M_n$ |
|---|---|---|
| 1 | 0 | 0 |
| 2 | 1 | 0 |
| 3 | 1 | 0 |
| 4 | 0 | 0 |
| ⋮ | | |
| $n_{max}$ | 0 | 0 |

32(2)

| n | $V_n$ | $M_n$ |
|---|---|---|
| 1 | 0 | 0 |
| 2 | 0 | 0 |
| 3 | 0 | 0 |
| 4 | 0 | 0 |
| ⋮ | | |
| $n_{max}$ | 0 | 0 |

30(3)

| n | $V_n$ | $M_n$ |
|---|---|---|
| 1 | 1 | 1 |
| 2 | 0 | 0 |
| 3 | 1 | 0 |
| 4 | 0 | 0 |
| ⋮ | | |
| $n_{max}$ | 0 | 0 |

VOLUME RESTORATION USING AN ACCUMULATOR MAP

BACKGROUND OF THE INVENTION

Many businesses rely on large-scale data processing systems for storing and processing business data. These large-scale data processing systems include a primary data volume that stores the business critical data. Large-scale data processing systems often create a backup copy of the primary data volume to safeguard against data corruption of the primary data volume. Creating a backup of the primary data volume is a procedure well known in the art. In essence, the procedure includes copying data from memory that stores the primary data volume to memory that stores the backup copy until the entire data content of the primary volume is replicated.

Occasionally, host computer system 12 unwittingly executes an invalid or erroneous data transaction. Execution of an invalid or erroneous data transaction results in corruption of data in the primary data volume. When the data corruption is discovered, the backup data volume can be used to restore the primary data volume to the state it occupied just before data was corrupted. Unfortunately, the data processing system will not respond to data transaction requests until the primary data volume is restored. This disrupts operations of businesses using large-scale data processing system. Accordingly, it is imperative to restore the primary data volume as soon as possible.

SUMMARY OF THE INVENTION

In a process to restore a data volume in a first memory, a virtual point-in-time (PIT) copy of the data volume is created. Creating the virtual PIT copy includes creating first, second and third maps in memory. Each of the first, second, and third maps includes a plurality of multi-bit entries. Each of the entries of the first and second maps corresponds to a respective memory region of the first memory, while each of the entries of the third map corresponds to a respective memory region of a second memory for storing data of the virtual PIT copy.

BRIEF DESCRIPTION OF THE DRAWINGS

The present invention may be better understood, and its numerous objects, features, and advantages made apparent to those skilled in the art by referencing the accompanying drawings.

FIG. 6 illustrates the VM maps of FIG. 3 after modification of the primary data volume in accordance with the process of FIG. 5;

FIG. 7 illustrates additional VM maps created by the host node shown in FIG. 1;

FIG. 13 illustrates the VM maps of FIG. 10 after modification of the virtual decision-support volume in accordance with the process of FIG. 12;

FIG. 14 illustrates an additional VM map created by the host node shown in FIG. 1;

The use of the same reference symbols in different drawings indicates similar or identical items.

DETAILED DESCRIPTION

Figure 1:
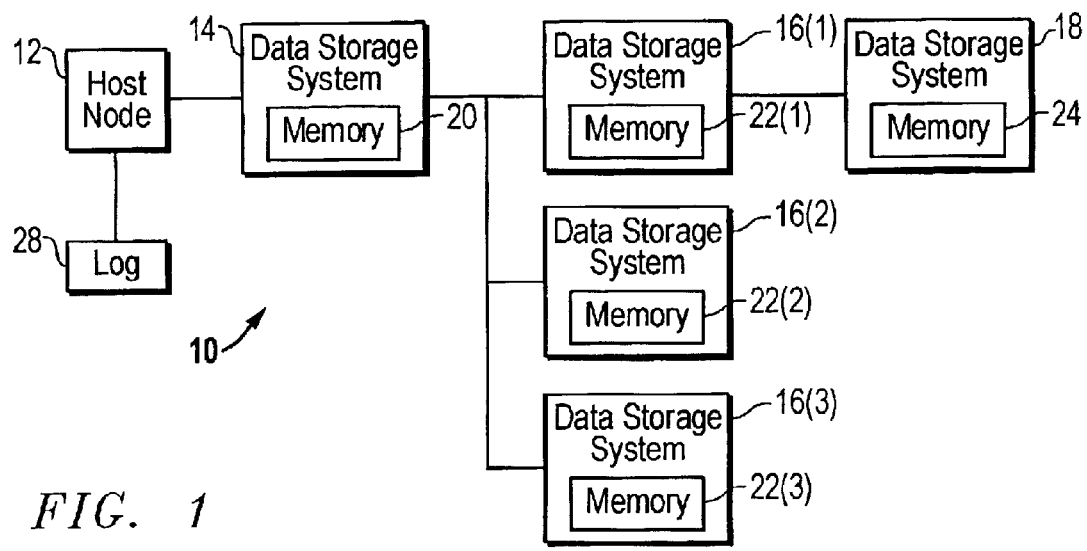
FIG. 1 is a block diagram of a data processing system.

FIG. 1 illustrates (in block diagram form) relevant components of a data processing system 10 employing the present invention. Data processing system 10 includes a host node 12 coupled to data storage systems 14, 16(1)–16(3) and 18. The term "coupled" should not be limited to what is shown in FIG. 1. Two devices (e.g., host node 12 and data storage system 14) may be coupled together either directly or indirectly via a third device. Although data storage systems such as 14, 16(1) and 18 appear in FIG. 1 to be coupled in series with host node 12, the present invention should not be limited thereto. Data storage systems such as data storage systems 14, 16(1), and 18 can be coupled together in parallel with host node 12 in an alternative embodiment. Additionally, data storage systems 16(2) and 16(3) may be coupled in parallel with host node 12.

Data storage systems 14,16(1)–16(3) and 18 include memories 20,22(1)–22(y), and 24, respectively. Each of these memories need not be contained in a separate data storage system. In an alternative embodiment, several or all of memories 20, 22(1)–22(y), and 24 may be parts of a single memory unit contained with one data storage system.

Each of the data memories 20, 22(1)–22(y) and 24, may take form in one or more dynamic or static random access memories, one or more arrays of magnetic or optical data storage disks, or combinations thereof. These data memories should not be limited to the foregoing hardware components; rather, these memories may take form in any hardware, software, or combination of hardware and software in which data may be persistently stored and accessed. Data memories 20, 22(1)–22(y), and 24 may take form in a complex construction of several hardware components operating under the direction of software. The data memories may take form in mirrored hardware. It is further noted that the present invention may find use with many types of redundancy/reliability systems. For example, the present invention may be used with a redundant array of independent disks (RAID). Moreover, the present invention should not be limited to use and connection with the host node of the data processing system. The present invention may find use in a storage switch or in any of many distinctive appliances that can be used with a data storage system.

Data memory 20 stores data of a primary data volume. The primary data volume is the working volume of data processing system 10. Data memories 22(1)–22(3) and 24 store or are configured to store data of separate data volumes. Data memory 22(1) stores or is configured to store data of a point in time copy of the primary data volume referred to herein as the backup volume. Memory 22(2) stores or is configured to store data of a point in time copy of the primary data volume referred to herein as the incremental backup volume. Memory 22(3) stores or is configured to store data of a point in time copy of the primary data volume referred to herein as the decision-support volume. Memory 24 stores or is configured to store data of a copy of the backup volume stored within memory 22(1) and is referred to herein as the restore volume As will be more fully described below, the restore volume can be used in restoring the primary data volume in the event of a data corruption thereof.

As will be more fully described below, each of the data volumes stored within memories 22(1)–22(3) and 24 can be virtual or real. For example, the backup volume in memory 22(1) is virtual when some data of the backup volume is found within memory 20 rather than memory 22(1). The backup volume is real when all data of the backup volume is stored in memory 22(1). A virtual data volume can be converted to a real data volume via a background data copying process performed by host node 12. In the background copying process, for example, data of the virtual backup volume is copied from memory 20 to memory 22(1) until all data of the backup volume is stored in memory 22(1).

Figure 2:
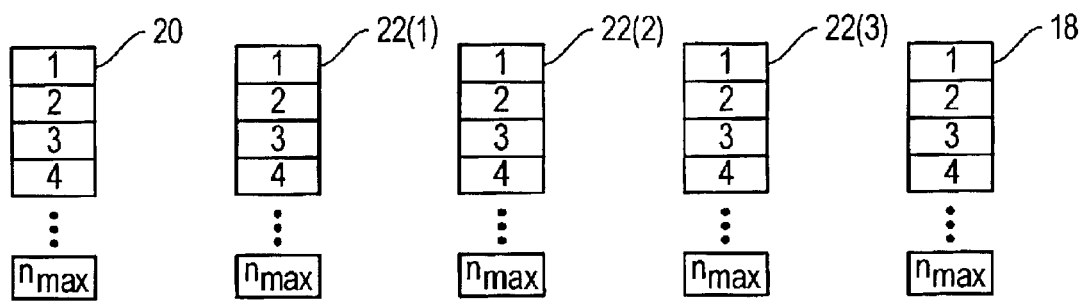
FIG. 2 includes block diagrams illustrating memory structure of data storage systems shown in FIG. 2.

FIG. 2 represents (in block diagram form) a logical structure of data memories 20, 22(1)–22(3) and 18. Each memory shown having $n_{max}$ memory blocks into which data can be stored. Each memory block shown in FIG. 2 represents one to an arbitrarily large number of regions in physical memory that store data. The physical memory regions of a block need not be contiguous to each other. However, the physical memory regions are viewed as logically contiguous by a data management system executing a host node 12. Any or all of memories 20, 22(1)–22(3) may have more than $n_{max}$ memory blocks.

For purposes of explanation, each block of memory 20 stores data of the primary data volume. The $n_{max}$ memory blocks of memory 22(1) can be allocated by host node 12 to store data of the backup volume. The $n_{max}$ memory blocks of memory 22(2) can be allocated by host node 12 for storing data of the incremental backup volume. The $n_{max}$ memory blocks of memory 22(3) can be allocated by host node 12 for storing data of the decision-support volume. Finally, the $n_{max}$ memory blocks of memory 24 can be allocated by host node 12 for storing data of the restore volume. Corresponding memory blocks in data memories 20, 22(1)–22(3), and 18 can be equal in size. Thus, memory block 1 of data memory 20 can be equal in size to memory block 1 of data memories 22(1)–22(3). Each of the memory blocks in data memory 20 may be equal in size to each other. Alternatively, the memory blocks in data memory 20 may vary in size. With continuing reference to FIGS. 1 and 2, host node 12 may take form in a computer system (e.g., server computer system) that processes requests from client computer systems (not shown) for some type of data transaction. Host node 12 generates read or write data transactions that access memory 20 in response to receiving requests from client computer systems. Host node 12 is capable of accesses memories 22(1)–22(3) and 18 via read or write data transactions.

Host node 12 includes a data storage management system (not shown) that takes form in software instructions executing on one or more processors (not shown) within host node 12. The data management system includes a file system and a system for managing the distribution of data of a volume across one or more memory devices. Volume Manager™ provided by VERITAS Software Corporation of Mountain View, Calif. is an exemplary system for managing the distribution of data of a volume across one or more memory devices. Volume and disk management products from other product software companies also provide a system for managing the distribution of volume data across memory devices. Hardware RAID adapter cards and RAID firmware built into computer systems likewise provide this function.

The data processing system 10 shown in FIG. 1 will be described with reference to host node 12 sequentially creating the backup, incremental backup, decision-support, and restore volumes. The present invention should not be limited thereto. As noted, each of these data volumes can be virtual or real. Each of these data volumes can be modified regardless of whether they are in the real or virtual state. The backup, incremental backup, and decision-support volumes are initially created as a virtual point in time copy of the primary data volume as it exists at the time each of the virtual data volumes is respectfully created. Host node 12 can create a virtual data volume according to the methods described in copending U.S. patent application Ser. No. 10/143,059 entitled "Method and Apparatus for Creating a Virtual Data Copy" which is incorporated herein by reference in its entirety.

Figure 3:
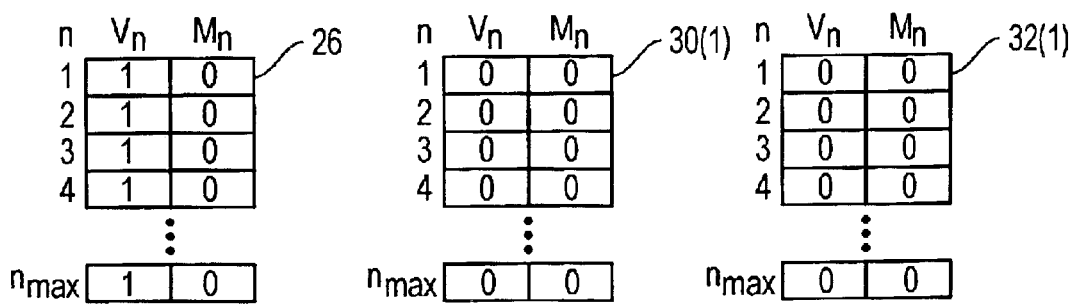
FIG. 3 illustrates Valid/Modified (VM) maps created by the host node shown in FIG. 2.

When host node 12 creates the virtual backup volume, host node 12 creates at least two valid/modified (VM) maps such as VM maps 26 and VM map 32(1) represented in FIG. 3. VM map 26 may be referred to herein as the accumulator map 26. Host node 12 may also create a third VM map 30(1) when the virtual backup volume is first created. Use of VM map 30(1) will be more fully described below. Each of the VM maps shown within FIG. 3 may be persistently stored in memory of host node 12 or elsewhere. Accumulator map 26 corresponds to memory 20 while VM map 32(1) corresponds to memory 22(1).

The accumulator map 26 and each of VM maps 30(1) and 32(1) include $n_{max}$ entries of two bits each in the embodiment shown in FIG. 3. Each entry of the accumulator map 26 corresponds to a respective block n of memory in memory 20, while each entry of VM map 32(1) corresponds to a respective block n of memory 22(1). The first and second bits in each entry are designated $V_n$ and $M_n$, respectively. $V_n$ in each entry, depending upon its state, indicates whether its corresponding memory block n contains valid data. For example, when set to logical 1, $V_2$ of the accumulator map 26 indicates that block 2 of memory 20 contains valid primary volume data, and when set to logical 0, $V_2$ of the accumulator map indicates that block 2 of memory 20 contains no valid primary volume data. It is noted that when $V_n$ is set to logical 0, its corresponding memory block n may contain data, but this data is not considered valid. In similar fashion, $V_2$ of VM map 32(1) when set to logical 1, indicates that block 2 of memory 22(1) contains valid data of the backup volume. On the other hand, $V_2$ of VM map 32(1), when set to logical 0, indicates that block 2 of memory 22(1) does not contain valid data of the backup volume.

$M_n$ in each entry of VM maps 26 and 32(1), depending upon its state, indicates whether data within its corresponding memory block and has been modified. For example, when set to logical 1, $M_3$ of the accumulator map 26 indicates that block 3 of memory 20 contains data that was modified via a write-data transaction at some point after creation of the virtual backup volume. When set to logical 0, $M_3$ of accumulator map 26 indicates that block 3 of memory 20 does not contain modified data. Likewise, $M_3$ in VM map 32(1), when set to logical 1, indicates that block 3 in memory 22(1) contains data that was modified via a write-data transaction after creation of the backup volume. When set to logical 0, $M_3$ of VM map 32(1) indicates that block 3 of memory 22(t) contains no modified data.

When the accumulator map 26 is first created, $V_n$, in each entry is initially set to logical 1 thus indicating that each block n in memory 20 contains valid data of the primary volume. When VM maps 30(1) and 32(1) are first created, $V_n$, and $M_n$, in each entry is set to logical 0. Because each entry in VM map 32(1) is initially set to 0, VM map 32(1) indicates that memory 22(1) does not contain valid or modified data of the backup volume. Host node 12 can change the state of one or more bits in each VM map entry using a single or separate I/O operation at the memory address that stores the map entry.

$M_n$ in each entry, depending on its state, indicates whether data within its corresponding memory block n has been modified. For example, when set to logical 1, $M_3$ of accumulator map 26 indicates that block 3 of memory 20 contains data that was modified via a write-data transaction at some point in time since the creation of the backup volume. When set to logical 0, $M_3$ of the accumulator map 26 indicates that block 3 in memory 20 contains data which has not been modified since the creation of the backup volume. Likewise, $M_3$ in VM map 32(1), when set to logical 1, indicates that block 3 and memory 22(1) contains data that was modified via a write-data transaction at some point in time since the creation of a backup data volume. When set to logical 0, $M_3$ of VM map 32(1) indicates that block 3 of memory 22(1) contains no modified data.

When accumulator map 26 is first created, $V_n$ in each entry is initially set to logical 1 thus indicating that each block n in memory 20 contains valid data of the primary volume. When VM map 32(1) is first created, $V_n$ and $M_n$ of each entry is set to logical 0 thus indicating that each block n of memory 22(1) contains no valid or modified data of the backup volume. Host node 12 can change the state of one or more bits in each map entry using a single or separate I/O operations at the memory address that stores the map entry.

Figure 4:
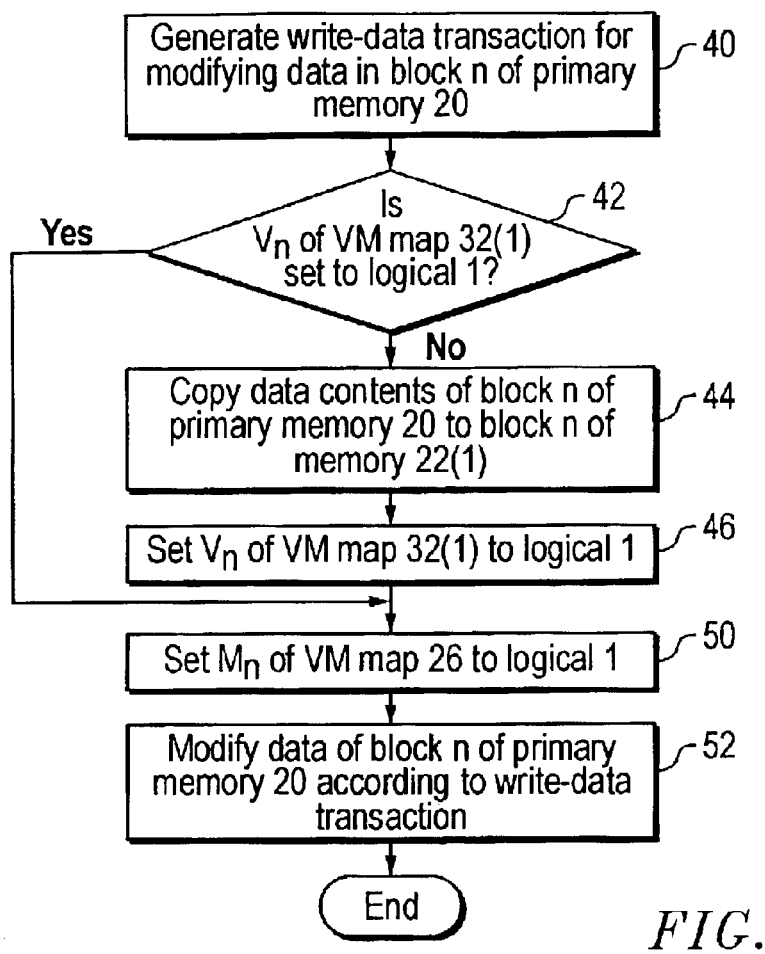
FIG. 4 is a flow chart illustrating operational aspects of writing or modifying data in the primary data volume.

Host node 12 may run a background copying process to transform a virtual data volume into a real data volume. In this background copying process, host node 12, for example, copies data of memory 20 to memory 22(1) in a block by block or blocks by blocks fashion until the virtual backup volume is transformed into a real backup volume. However, before this background copying process is started or completed, host ode 12 can modify data of the primary data volume. FIG. 4 illustrates relevant operational aspects of modifying data of the primary data volume via a write-data transaction after creation of the virtual backup volume.

The flow chart shown in FIG. 4 implements one embodiment of what is commonly referred to as a copy on write process. The process shown in FIG. 4 starts when host node 12 generates a write-data transaction for modifying data in block n of primary memory 20 as shown in step 40. In response, host node 12 accesses VM map 32(1) in step 42. If $V_n$, of VM map 32(1) is set to logical 0, then the process proceeds to step 44 where host node 12 copies the data contents of block n of primary memory 20 to block n of memory 22(1). Thereafter, in step 46, host node 12 sets $V_n$ of VM map 32(1) to logical 1 in step 46. In response to step 46 or in response to a determination in step 42 that $V_n$ is set to logical 1, host node sets $M_n$, of accumulator map 26 to logical 1 in step 50. Ultimately, host node 12 modifies data of block n of the primary memory 20 in accordance with the write-data transaction generated in step 40.

Figure 5:
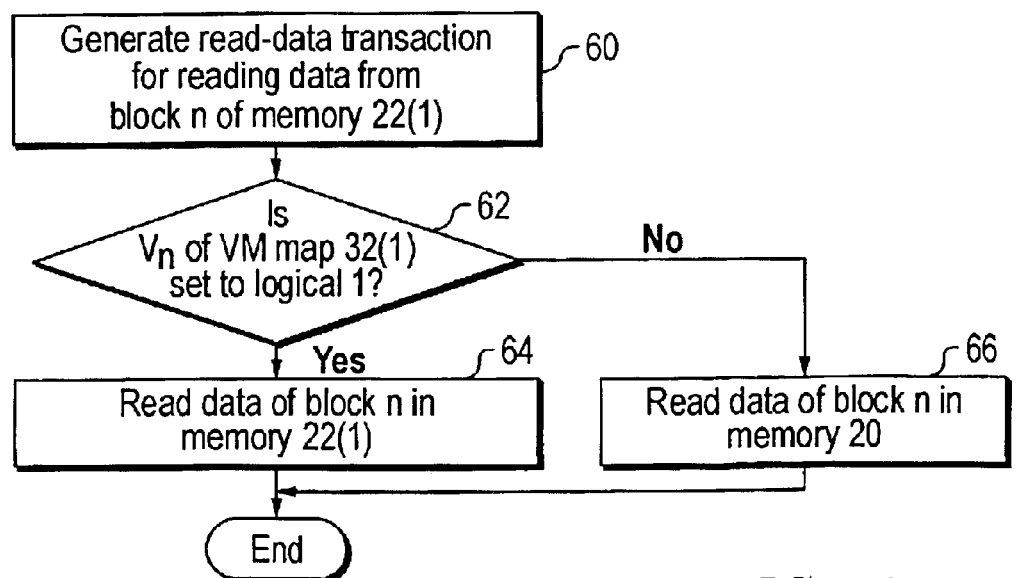
FIG. 5 is a flow chart illustrating operational aspects of reading data from the primary data volume of FIG. 1.

In addition to the ability to modify the data contents of the primary volume before the virtual backup volume is transformed into a real volume, host node 12 can read data from the virtual backup volume. FIG. 5 illustrates operational aspects of reading data from the virtual backup volume. The process shown in FIG. 5 is started in step 60 when host node 12 generates a read data transaction for reading data from block n of memory 22(1). Thereafter, in step 62, host node 12 accesses VM map 32(1) to determine the state of $V_n$ therein. If $V_n$ is set to logical 1, the data sought is read from block n in memory 22(1) as shown in step 64. Otherwise, the data is read from block n in memory 20 as shown in step 66.

Figures 6, 7:
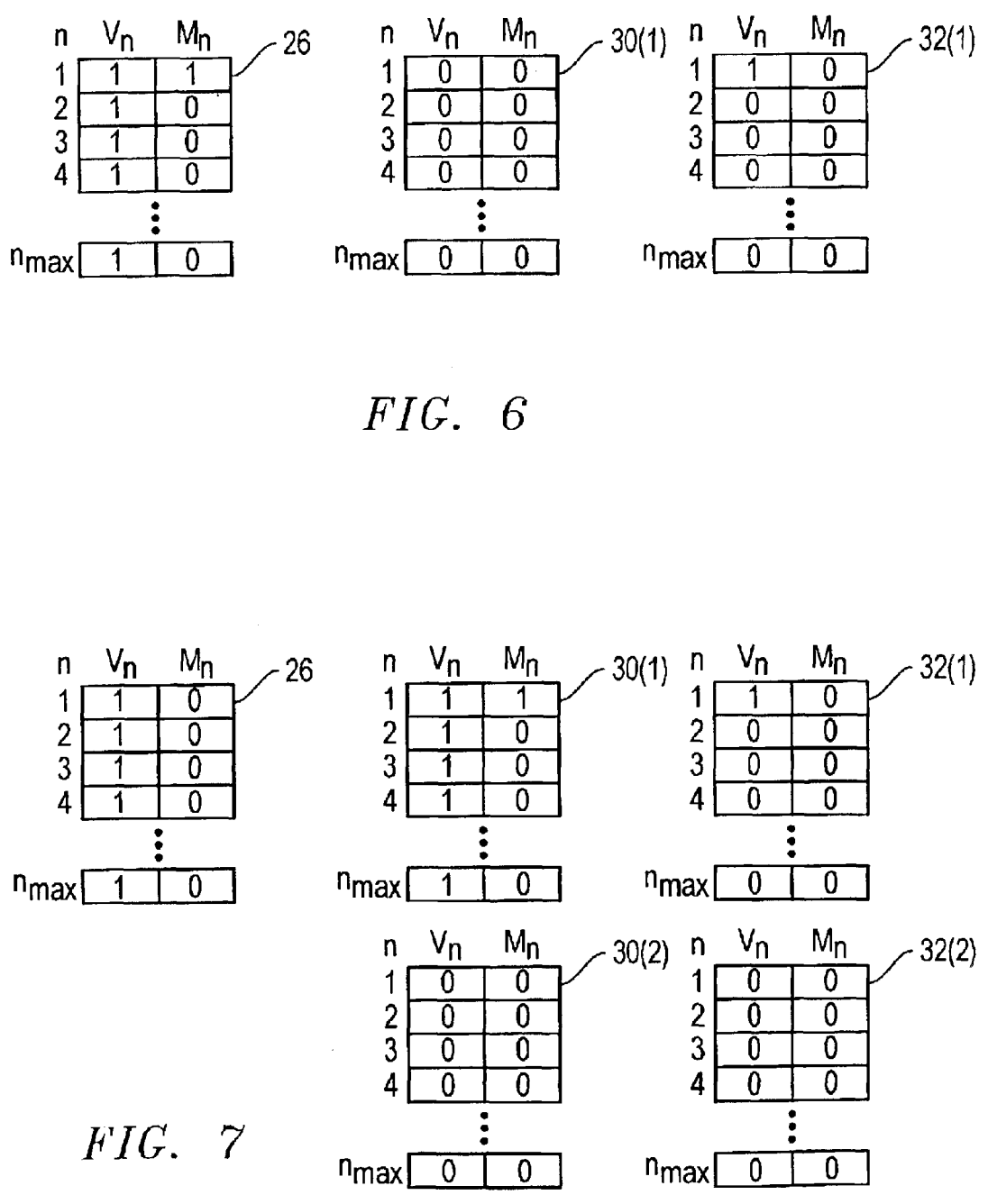

FIG. 6 illustrates the VM maps of FIG. 3 after implementing a first write-data transaction for modifying data in block 1 of the primary data volume in accordance with the copy on write process shown in FIG. 4. It is noted that host node 12 stores a copy of each write-data transaction in log 28 that modified data of the primary data volume. Log 28 stores write data transactions in the order in which they were received from host node 12.

Before the virtual backup volume is transformed into a real backup volume, host node 12 can create the incremental backup volume mentioned above. Host node 12 creates VM maps 30(2) and 32(2) shown in FIG. 7 when host node 12 creates the virtual incremental backup volume. Moreover, when the virtual incremental backup volume is created, host node 12 copies the current contents of accumulator map 26 into VM map 30(1). Copying the contents of the accumulator map 26 into VM map 30(1) includes for each entry n: logical ORing the original $V_n$, bits of accumulator map 26 and VM map 30(1), the result of which is stored into VM map 30(1) as the updated $V_n$, bit of VM map 30(1), and; logically ORing the original $M_n$, bits of accumulator map 26 and VM map 30(1), the result of which is stored as the updated $M_n$, bit in VM map 30(1). After accumulator map 26 is copied into VM map 30(1), host node 12 clears each of the $M_n$ bits in accumulator ma 26. FIG. 7 shows the state of accumulator map 26 after its contents have been copied into VM map 30(1) and after its $M_n$, bits have been cleared to logical 0. By copying the contents of accumulator map 26 into VM map 30(1) VM map 30(1) records the state of accumulator map 26 at the time the virtual incremental backup volume is created. In one sense, VM map 30(1) is transformed into a map that relates changes of the primary data volume relative to the backup volume.

Figure 8:
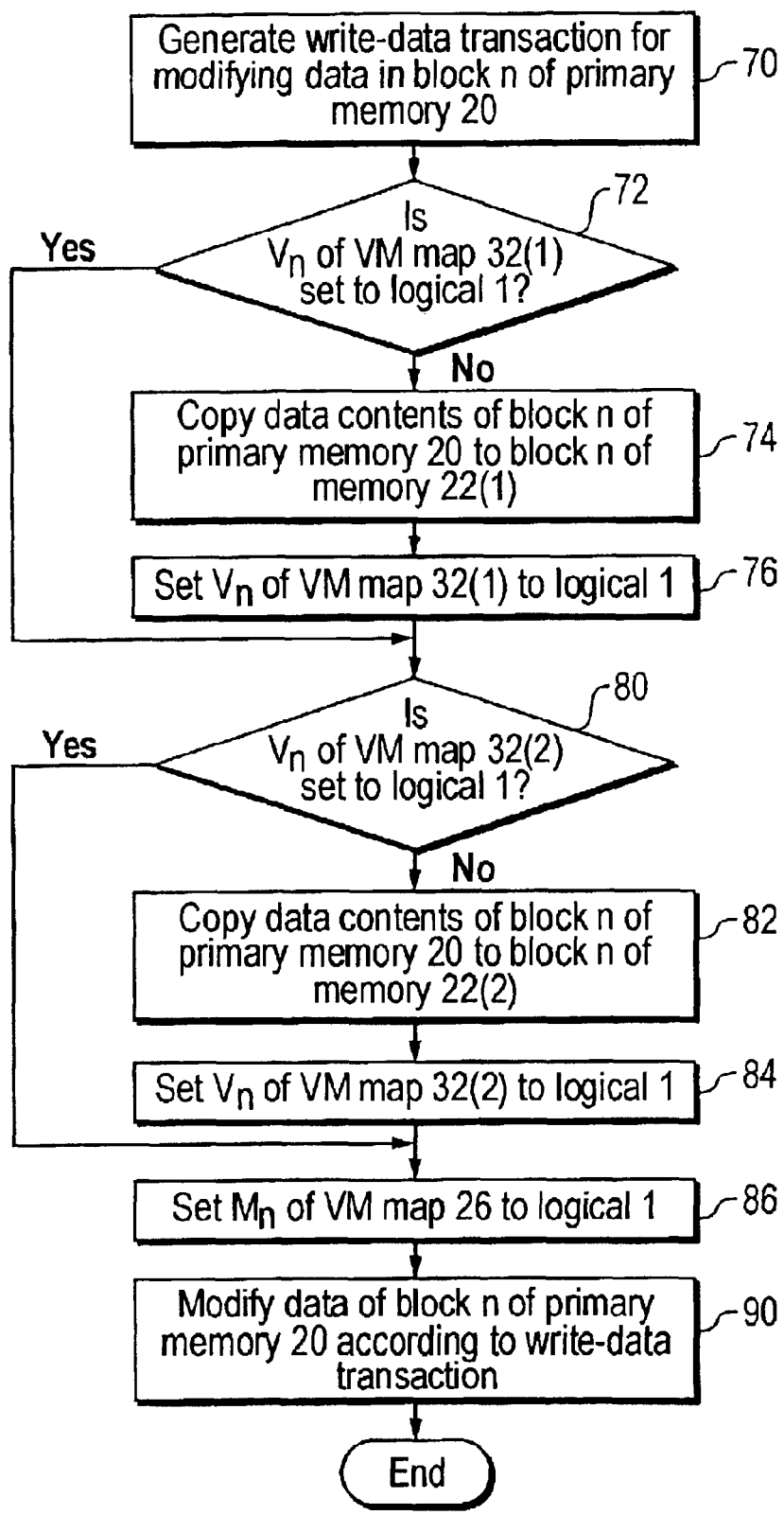
FIG. 8 is a flow chart illustrating operational aspects of writing or modifying data in the primary data volume.

After creation of the virtual incremental backup and after the contents of the accumulator map 26 is copied into VM map 30(1), host node 12 can implement a background copying process which transforms the incremental backup volume into a real incremental backup volume. However, before this background processing starts or completes, host node 12 can modify the contents of the primary data volume. FIG. 8 illustrates operational aspects implemented by host node for modifying data in the primary data volume.

The process shown in FIG. 8 starts when host node 12 generates a write-data transaction for modifying data in block n of primary memory 20 in step 70. Host node, in response to step 70, accesses VM map 32(1) to determine the state of $V_n$, therein. If $V_n$ is set to logical 0, data of the primary data volume must first be copied to the virtual backup volume. More particularly, in step 74, host node 12 copies the data contents of block n of primary memory 20 to block n of memory 22(1). Thereafter, in step 76, host node 12 sets $V_n$ of VM map 32(1) to logical 1. In response to 76 or in response to a determination in step 72 that $V_n$ of VM map 32(1) is set to logical 1, host node 12 accesses VM map 32(2) to determine the state of $V_n$ therein as shown in step 80. If $V_n$ is set to logical 0, then the host node 12 copies the data contents of block n of primary memory 20 to block n of memory 22(2) and sets $V_n$ of VM map 32(2) to logical 1 as shown in steps 32 and 84. After $V_n$ is set to logical 1, or in response to a determination in step 80 that $V_n$ of VM map 32(2) is set to logical 1, host node 12 sets $M_n$ of accumulator map 26 to logical 1 in step 86. Ultimately, in step 90, host node 12 modifies data of block n in primary memory 20 according to the write-data transaction generated in step 70.

Figure 9:
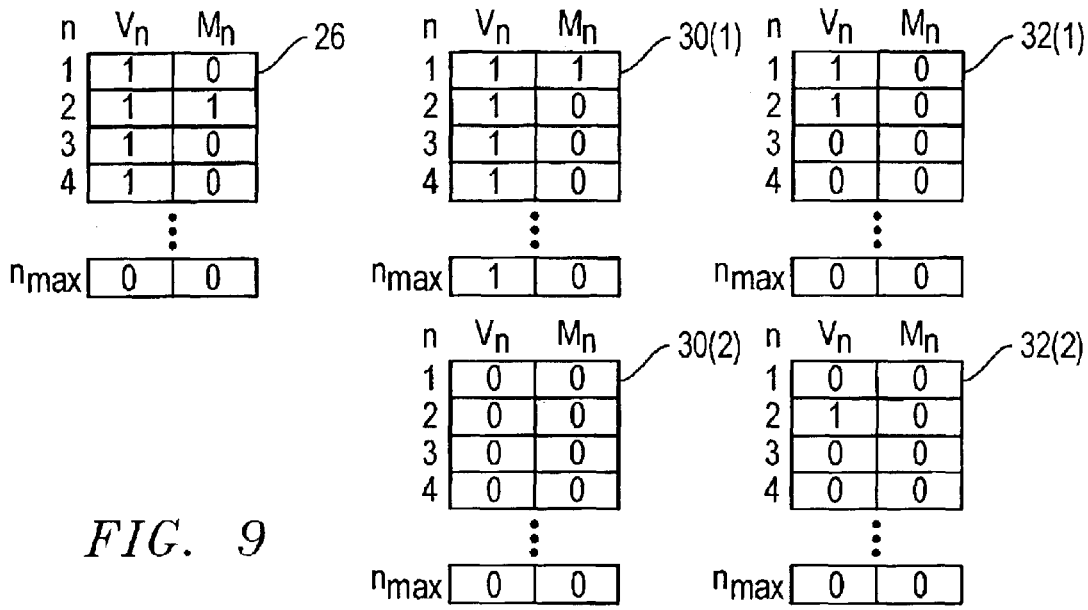
FIG. 9 illustrates the VM maps of FIG. 7 after modification of the primary data volume in accordance with the process of FIG. 8.

FIG. 9 illustrates the VM maps shown in FIG. 7 after implementing a write-data transaction in accordance with the process shown in FIG. 8. More particularly, FIG. 9 shows modification of VM maps of FIG. 7 after host node 12 implements a second write-data transaction for modifying data in block 2 of the primary memory 20. It is noted that the second write-data transaction is stored in log 28 (see FIG. 1) along with the first write data transaction.

As noted, host node 12 can transform the virtual implemental backup volume into a real instrumental backup volume using a background copying process. However, before the virtual implemental backup volume is transformed into a real incremental backup volume, host node 12 can create a third virtual point in time copy of the primary volume referred to herein as the virtual decision-support volume. Host node 12 creates the virtual decision-support volume by creating VM maps 30(3) and 32(3) shown in FIG. 10. Initially, each $V_n$ and $M_n$ entry in VM maps 30(3) and 32(3) are set to logical 0. Each entry n in VM map 32(3) corresponds to a respective block n of memory 22(3). $V_n$, in VM map 32(3) indicates whether its corresponding block of memory 22(3) contains valid data copied from primary memory 20 since the creation of the virtual decision-support volume. $M_n$ in VM map 32(3) indicates whether its respective block in memory 22(3) contains data which has been modified since creation of the virtual decision-support volume. VM map 30(3) will be more fully described below.

After creation of VM maps 30(3) and 32(3), host node 12 copies the contents of the accumulator map 26 into VM maps 30(1) and 30(2). The copying process is similar to that described above. More particularly, with respect to VM map 30(1), for each entry n; the original $V_n$ bits of accumulator map 26 and VM map 30(1) are logically ORed, the result of which is stored as the updated $V_n$ bit in VM map 30(1), and; original $M_n$, bits in accumulator map 26 and VM map 30(1) are logically ORed, the result of which is stored as the updated $M_n$ bit in VM map 30(1). Similarly, host node 12 copies contents of accumulator map 26 into VM map 30(2) by, for each entry: logically ORing the original $V_n$ bits in accumulator map 26 and VM map 30(2), the result of which is stored as the updated $V_n$ bit in VM map 30(2) and; logically ORing the original $M_n$ bits in accumulator map 26 and VM map 30(2), the result of which is stored as updated $M_n$, bit in VM map 30(2).

Figure 10:
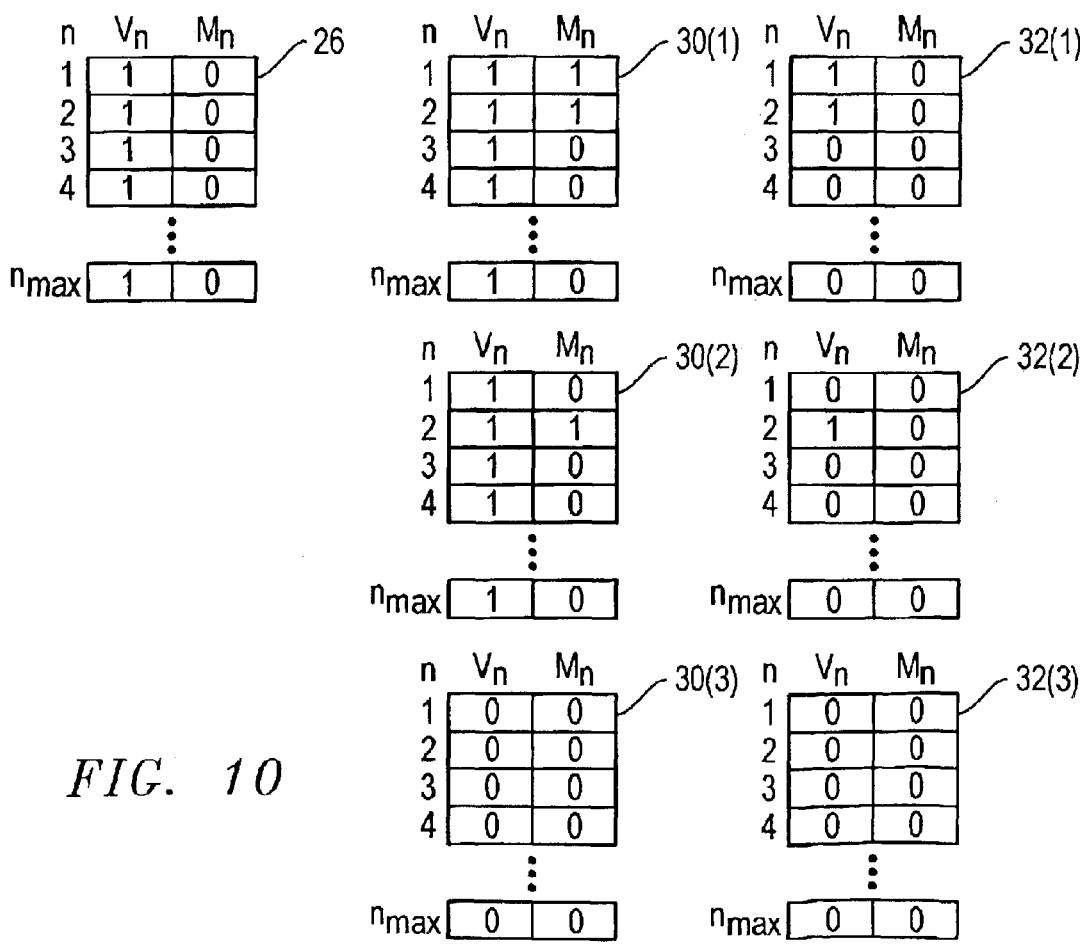
FIG. 10 illustrates additional VM maps created by the host node shown in FIG. 1.

By copying the contents of accumulator map 26 into VM maps 30(1) and 30(2), VM maps 30(1) and 30(2) record the state of accumulator map 26 at the time the virtual decision-support volume is created. VM map 30(2) is transformed into a map that relates changes of the primary data volume relative to the incremental backup volume. Once host node 12 copies the contents of accumulator map 26 into VM maps 30(1) and 30(2), host node 12 clears each $V_n$ bit in accumulator map 26 to logical 0. FIG. 10 also shows the state of accumulator 26 after host node 12 clears each of the $M_n$ bits therein.

Figure 11:
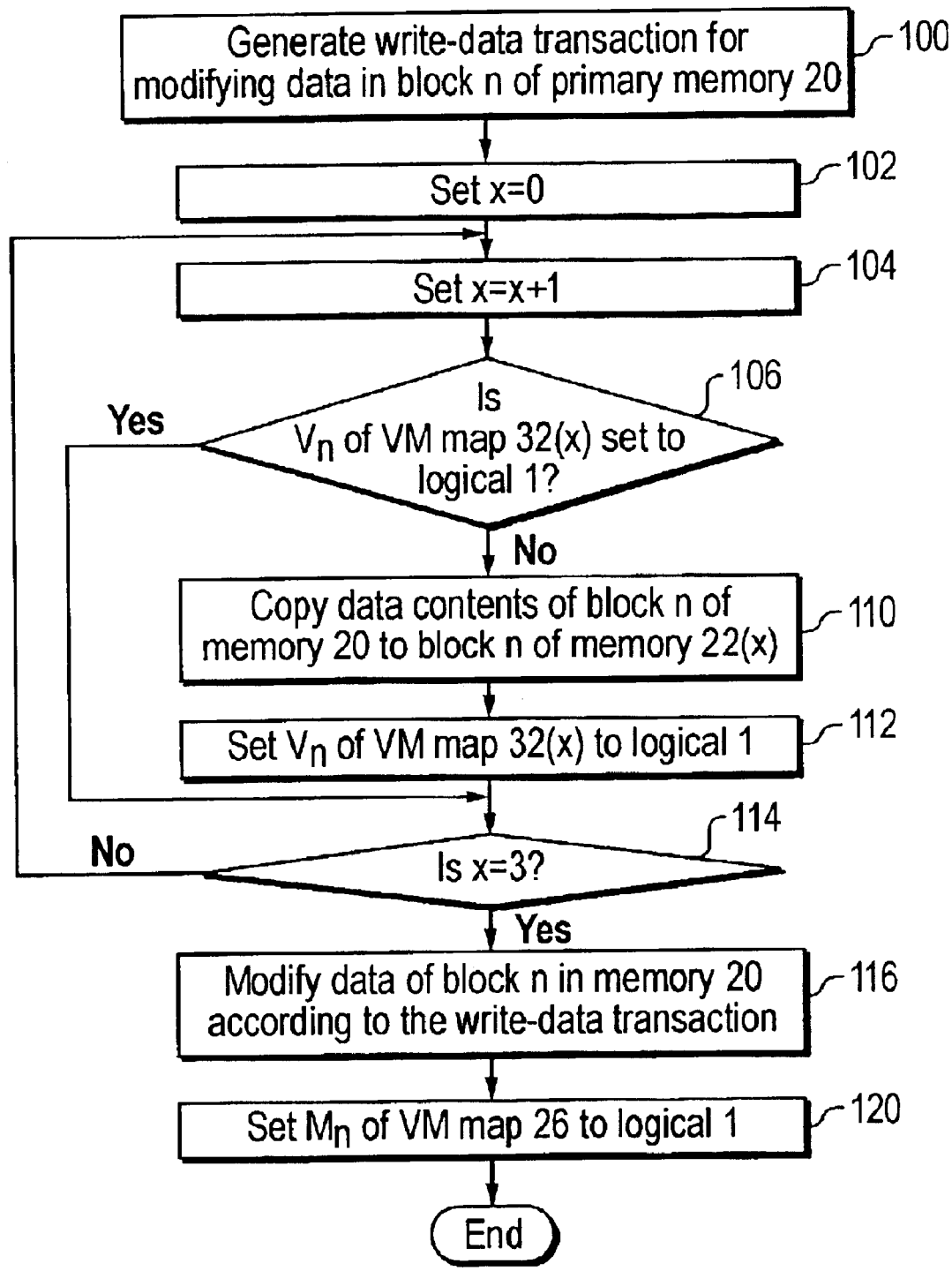
FIG. 11 is a flow chart illustrating operational aspects of writing or modifying data in the primary data volume.

The virtual decision-support volume can be transformed into a real decision-support volume by virtue of a background copying process implemented by host node 12. However, before the virtual decision-support volume can be transformed into a real volume, or before the virtual backup and incremental backup volumes can be transformed into real backup and incremental backup volumes, host node 12 can modify the data contents of the primary data volume. FIG. 11 illustrates operational aspects of host node 12 modifying data contents of the primary volume.

The process shown in FIG. 11 starts when host node 12 generates a write-data transaction for modifying data in block n of primary memory 20 in step 100. In steps 102 and 104, host node 12 sets variable x to 0 in increments x by 1. Thereafter, in step 106, host node accesses VM map 32(x) to determine the state of $V_n$, therein. If host node 12 determines that $V_n$ is set to logical 0 in step 106, then host node copies the data contents of block n of primary memory 20 to block n of memory 22(x) and sets $V_n$, of VM map 32(x) to logical 1 as shown in steps 110 and 112. In response to step 112 or in response to a determination that $V_n$ of VM map 32(x) is set to logical 1 in step 106, host node compares variable x to 3 in step 114. If x=3, host node modifies data of block n in primary memory 20 according to the write-data transaction generated in step 100, and sets $M_n$ of accumulator map 26 to logical 1 in steps 116 and 120. Otherwise, the process returns to step 104 where x is incremented by 1 and steps 106–114 are reexecuted. Eventually, after each of memories 22(1)–22(3) contains valid or valid and modified copy of data in block n of primary memory 20, host node modifies data in block n in memory 20 according to the write-data transaction of step 100 and sets $M_n$ of VM map 26 to a logical 1 as shown in steps 116 and 120.

Figure 12:
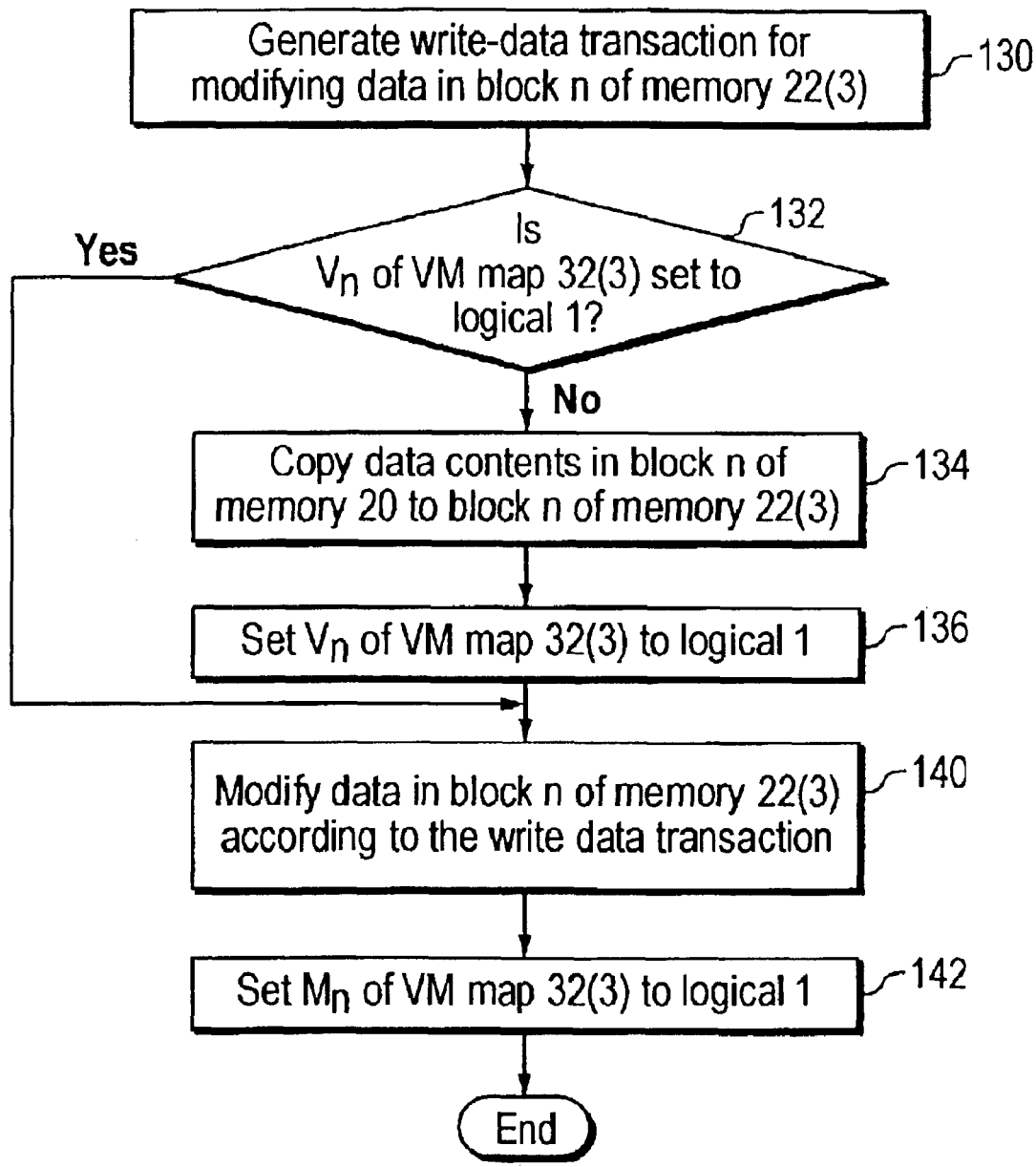
FIG. 12 is a flow chart illustrating operational aspects of writing or modifying data in the virtual decision-support volume.

The virtual decision-support volume can be transformed into a real decision-support volume by host node 12 implementing a background copying process. However, before the virtual decision-support line is transformed into a real decision-support line, host node can modify the contents of the virtual decision-support volume. It is noted that once the contents of a virtual data volume is modified, the virtual data volume is referred to as a modified virtual data volume. FIG. 12 illustrates relevant aspects of host node 12 modifying data of the decision-support volume.

More particularly, the process shown in FIG. 12 initiates when host node 12 generates a write-data transaction for modifying data in block n of memory 22(3) as shown in step 130. In response to step 130, host node accesses VM map 32(3) to determine the state of $V_n$ therein. If host node 12 determines that $V_n$ is set to logical 0 in step 132, host node copies the data contents in block n of memory 20 to block n of memory 22(3) and sets $V_n$ in VM map 32(3) to logical 1 in steps 134 and 136. In response to step 136 or in response to a determination that $V_n$ in VM map 32 is set to logical 1, host node modifies data in block n of memory 22(3) in accordance with the write-data transaction generated in step 130 and sets $M_n$ of VM map(3) to logical 1 in steps 140 and 142. FIG. 13 illustrates the VM maps shown in FIG. 10 after implementation of one write-data transaction for modifying data of the virtual data support volume. FIG. 13 also shows the state of VM maps shown in FIG. 10 after implementing a third write-data transaction for modifying data of the primary volume. The third write-data transaction is stored in log 28 along with the first and second write data transactions described above. The third write data transaction, as noted, modifies data in block n of primary memory 20**.

The primary data volume may be corrupted as a result of improper software behavior or in response to human error. Businesses seek to correct a corrupted data volume as soon as possible. A corrupted data volume can be corrected by by restoring the data volume to its state just prior to data corruption thereof. U.S. patent application Ser. No. 10/254,753 entitled, "Method and Apparatus for Restoring a Corrupted Data Volume" describes one method for restoring a primary data volume. U.S. patent application Ser. No. 10/254,753 is incorporated herein by reference in its entirety. In correcting the primary data volume, host node 12 creates a virtual restore volume. Host node 12 creates the virtual restore volume by creating the VM map 34 shown in FIG. 14. VM map 34, like the other VM maps shown in FIG. 14, includes n entries, each having a $V_n$ and $M_n$ bit. Each entry in VM map 34 corresponds to a memory block n of memory 24. Each $V_n$, depending upon its state, designates whether a respective block n of memory 24 contains valid data. $M_n$, in VM map 34, depending upon its state, indicates whether data in a respective block n of memory 24 contains data modified since creation of the virtual restore volume. Initially, when the virtual restore volume is created, all entries of VM map 34 are set to logical 0.

Figure 14:
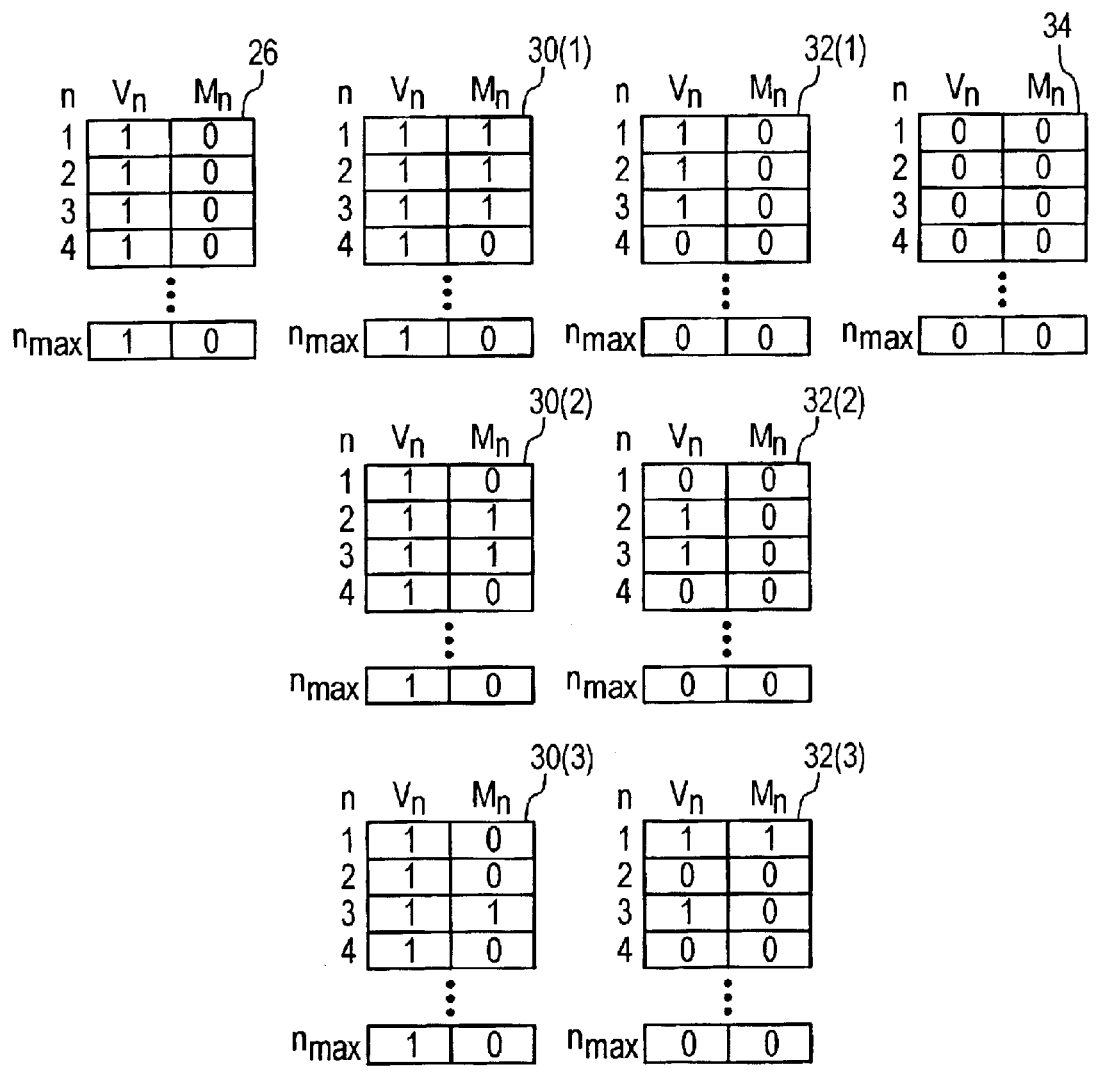

Just after creation of the virtual restore volume, the contents of the accumulator map 26 are copied into each of the VM maps 30(1)–30(3). FIG. 14 shows the result of copying the accumulator map 26 into VM maps 30(1)–30(3). After copying accumulator map 26 into VM maps 30(1)–30(3), each of the $M_n$, bits in accumulator map 26 is cleared to logical 0 by host node 12.

Figure 15:
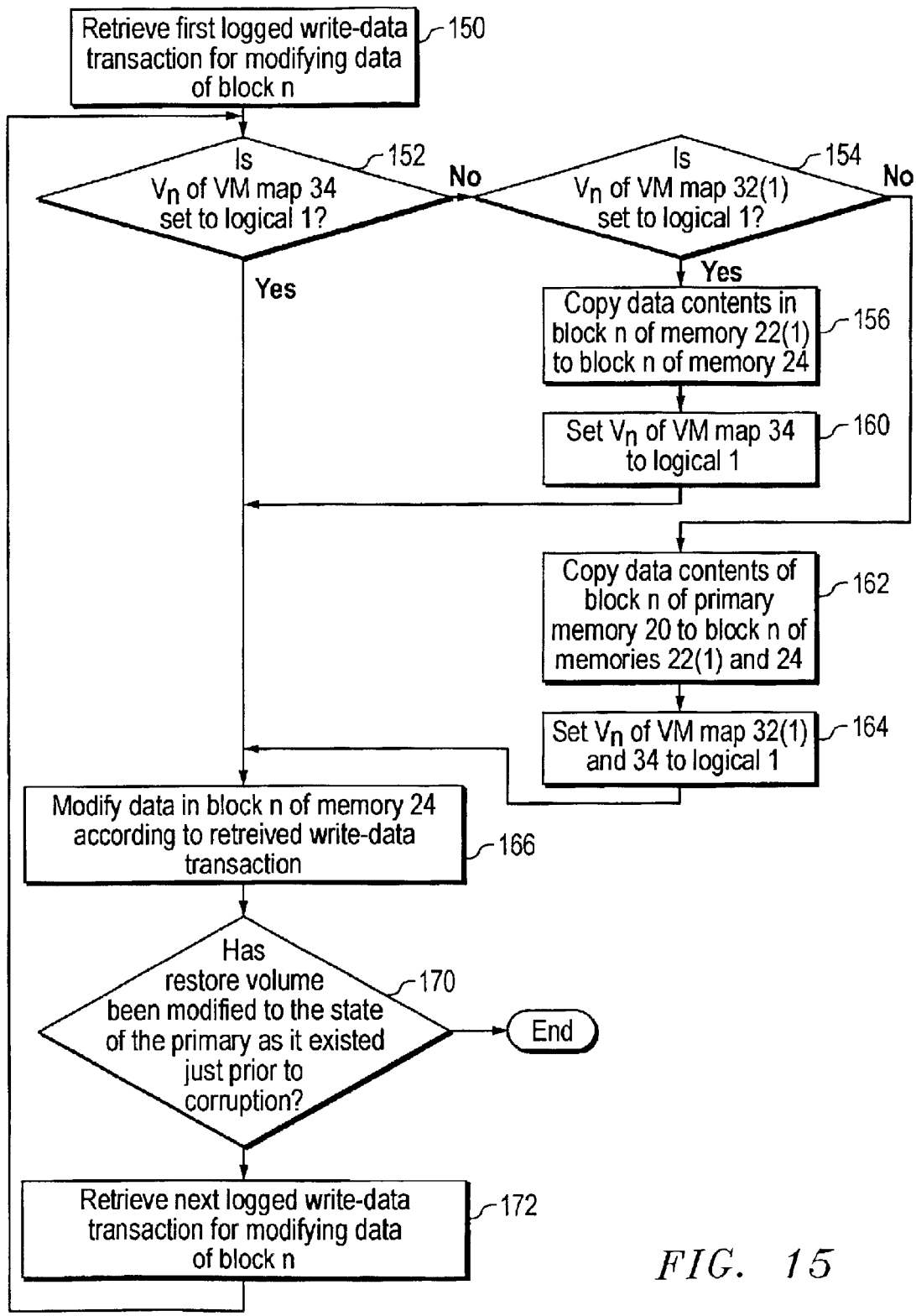
FIG. 15 is a flow chart illustrating operational aspects of restoring a corrupted primary data volume.

After creation of the virtual restore volume, host node replays the contents of log 28 to modify the virtual restore volume to the state of the primary volume just prior to data corruption thereof. FIG. 15 illustrates operational aspects of replaying the contents of log 28. More particularly, host node 12 reads the first logged write-data transaction for modifying data of block n from log 28 as shown in step 150. In response, host node 12 accesses VM map 34 to determine the state of $V_n$ therein. If $V_n$ is equal to logical 0, the process proceeds to step 154 where host node 12 accesses VM map 32(1) to determine the state of $V_n$ therein. If $V_n$ is equal to logical 0 in step 154, host node 12 copies the data contents of block n of primary memory 20 to block n of memories 22(1) and 24 as shown in step 162. Further, as shown in step 164, host node 12 sets $V_n$ VM maps 32(1) and 34 to logical 1. If in step 154 $V_n$ of map 32(1) is set to logical 1, then host node 12 copies the data contents in block n of memory 22(1) to block n of memory 24. Thereafter, in step 160, host node sets $V_n$ of VM map 34 to logical 1.

Figure 16:
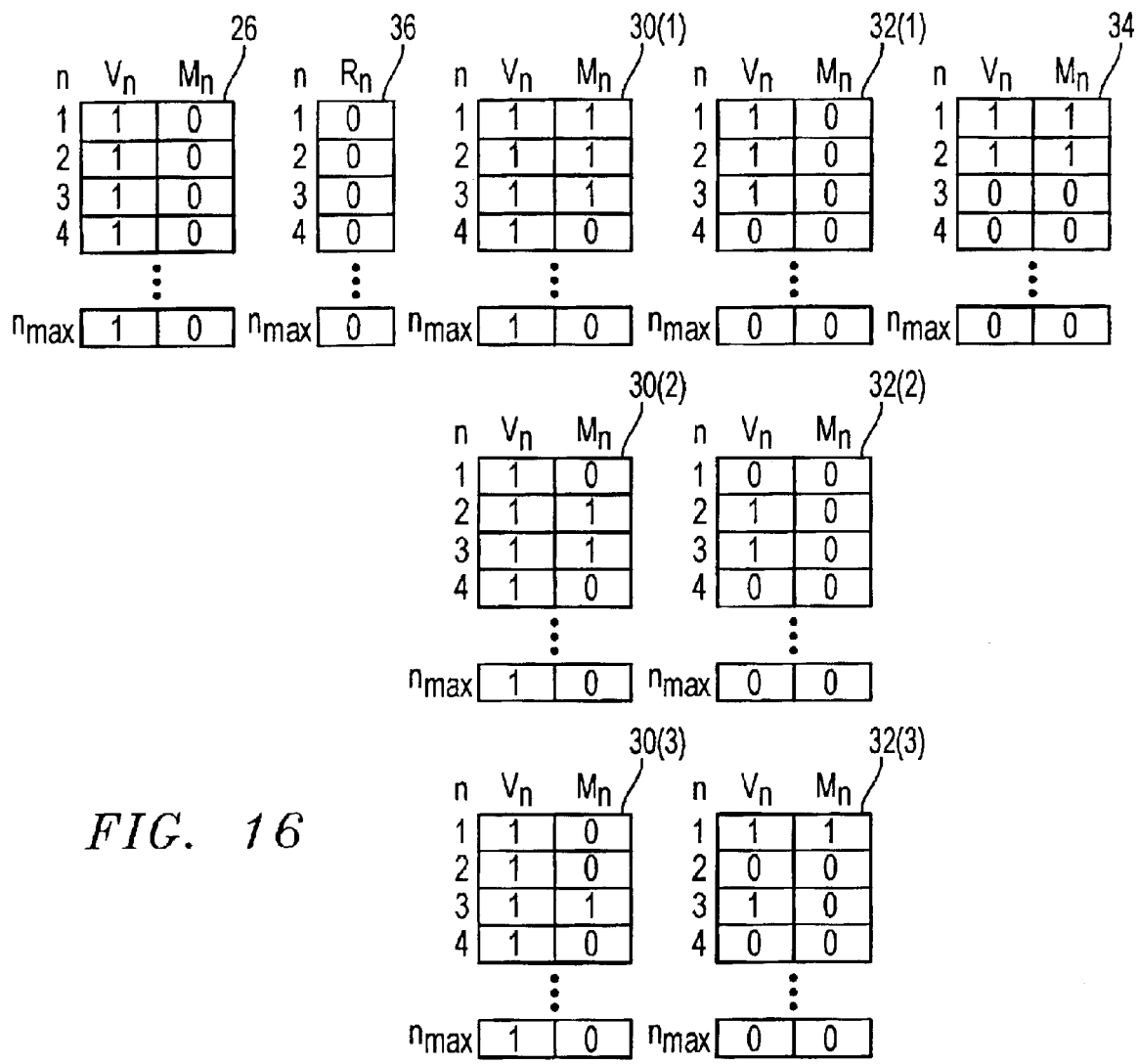
FIG. 16 illustrates the VM maps of FIG. 14 after modification thereof.

After steps 160 or 164 or after a determination that $V_n$ of VM map 34 is set to logical 1 in step 152, host node 12 modifies data in block n of memory 24 in accordance with the most recently retrieved write-data transaction from log 28 and sets $M_n$, of VM map 34 to logical 1. Host node 12 then determines in step 170 whether the virtual restore volume has been modified in step 166 to equal the state of the primary volume as it existed just prior to corruption thereof. This can be done by simply replaying the write-data transactions stored in log 28 in the order in which they were received up to the write-data transaction that caused the data corruption. If the restored volume has not been modified to the appropriate state, host node 12 retrieves the next logged write-data transaction from log 28 in step 172 and the process repeats itself beginning with step 152. Eventually, the restore volume is modified to the state of the primary just prior to corruption thereof in step 170 and the process ends. FIG. 16 shows the state of the VM maps shown in FIG. 14 after modifying the virtual restore volume with the contents of log 28 up to but not including the write-data transaction that caused the corruption.

Figure 17:
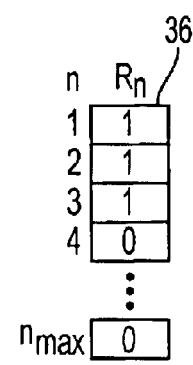
FIG. 17 illustrates a restore map created by the host node of FIG. 1.

After implementation of the process shown in FIG. 15, host node creates a restore map 36, which is also shown in FIG. 16. Restore map 36 includes n 1-bit entries. Each of the entries of map 36 is designated $R_n$ and set initially to logical 0 by host node 12. Thereafter, for each entry n, host node 12 logically ORs $M_n$, in accumulator map 26 and VM maps 32(1) and 34. Restore map 36 shown in FIG. 17 shows the restore map 36 shown in FIG. 16 after host node sets the state of the $R_n$ bits therein. $R_n$ indicates whether the data contents of block n of primary memory 20 is to be overwritten with the data contents of memory 24. More particularly, when set to logical 1, $R_n$ indicates that block n of primary memory 20 is to be overwritten with the data contents of block n of memory 24. When host node 12 overwrites data of block n in memory 20, host node 12 switches the state of $R_n$ from logical 1 to logical 0.

Before host node 12 restores the contents of the primary volume to the contents of the modified virtual restorer volume, host node 12 can access the primary data volume and modify data in accordance with a write data transaction. However, before the primary data volume can be modified, accumulator map 26 and VM maps 30(1)–30(3) should be updated to account for the restoration of the primary data volume. Each of VM maps 30(1)–30(3) is updated in accordance with the following equations:

$$V_n(\text{updated}) = \overline{R}_n$$

$$M_n(\text{updated}) = R_n \cdot V_n(\text{original}) \cdot \overline{M}_n(\text{original})$$

Figure 18:
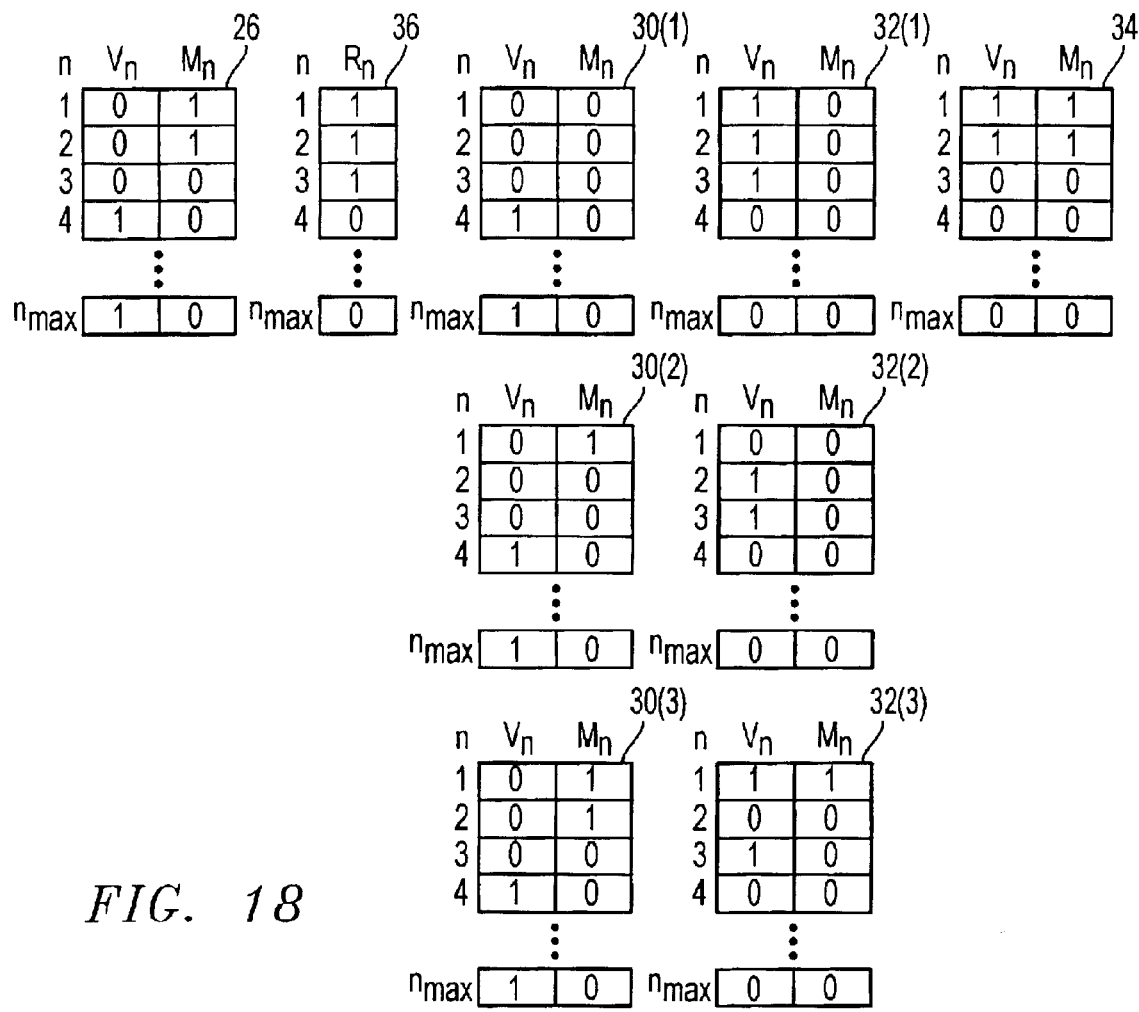
FIG. 18 illustrates the VM maps of FIG. 14 after modification thereof.

FIG. 18 shows the VM maps of FIG. 17 after updating the $V_n$ and $M_n$ bits of $V_n$ maps 30(1) through 30(3) in accordance with the above equations. After VM maps 30(1)–30(3) are updated, accumulator map 26 should also be updated to account for the instant restoration of the primary data volume to the contents of the virtual restore volume. Accumulator map 26 is updated in accordance with the process shown in FIG. 19. More particularly, host node sets n to zero in step 180. In step 182 host node 12 increments in by 1. In step 184 logically ORs a $V_n$ bits of VM maps 30(1)–30(3) the result of which is stored as the updated $V_n$, bit of accumulator map 26. In step 186 host node 12 logically ORs the $M_n$ bits of VM maps 30(1), the result of which is stored in accumulator map 26 as the updated $M_n$ bit. In step 190, host node 12 compares n to $n_{max}$. If $n=n_{max}$, the process ends. Otherwise, the process repeats beginning with step 182. FIG. 18 shows accumulator map 26 updated in accordance with the process described in FIG. 18.

Once the accumulator map 26 is updated, each entry n encodes one of four states. More particularly, the state of each entry of accumulator map 26 is encoded with the following:

| $V_n M_n$ | State | |
|-----------|----------|-----|
| 00 | Invalid | (I) |
| 01 | Previous | (P) |
| 10 | Current | (C) |
| 11 | Modified | (M) |

As noted above, host node 12 is capable of accessing the primary data volume before the primary data volume has been restored to the contents of the modified virtual restore volume. FIG. 10 illustrates one process for modifying data of the primary data volume. In step 200, host node 12 generates a data transaction for modifying data of block n of memory 20. In response, host node accesses accumulator map 26 and ascertains the status of entry n therein as shown in step 202. If entry n is equal to previous (P) or current (C), then the data contents of block n of number 20 is copied to block n of memories 21(1)–21(3) as shown in step 204. Thereafter or in response to a determination in step 202 that entry n of accumulator map 26 is not set to P or C, in step 206 host node determines whether entry n of the accumulator map 26 is set to P or invalid (I). If entry n is set to P or I, then host node accesses VM map 34 to determine the state of $V_n$ therein. If $V_n$ is equal to logical 1 in step 210, host node copies the data contents of block n of memory 22(1) to block n of memory 20 as shown in step 212. Otherwise, host node copies the data contents of block n of memory 24 to block n of memory 20 as shown in step 222. After step 212, or step 222, or in response to a determination in step 206 the entry n of the accumulator map 26 is not set to P or 1, then host node 12 modifies data in block n of memory 20 according to the write-data transaction as shown in step 214. In step 216, host node 12 clears $R_n$ to logical 0, and finally in step 220 host node sets $M_n$ and $V_n$ of accumulator map 26 to logical 1.

Figure 19:
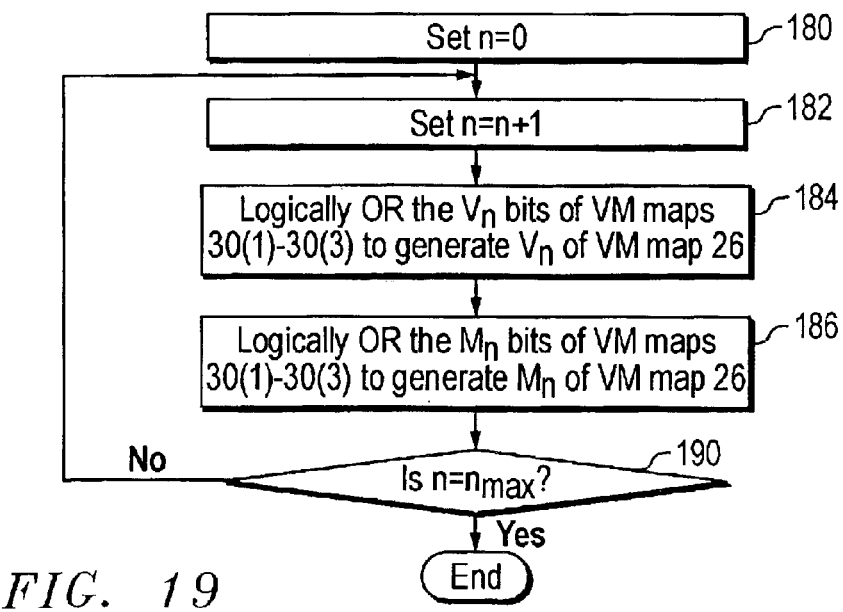
FIG. 19 is a flow chart illustrating operational aspects of updating the accumulator map.
Figure 20:
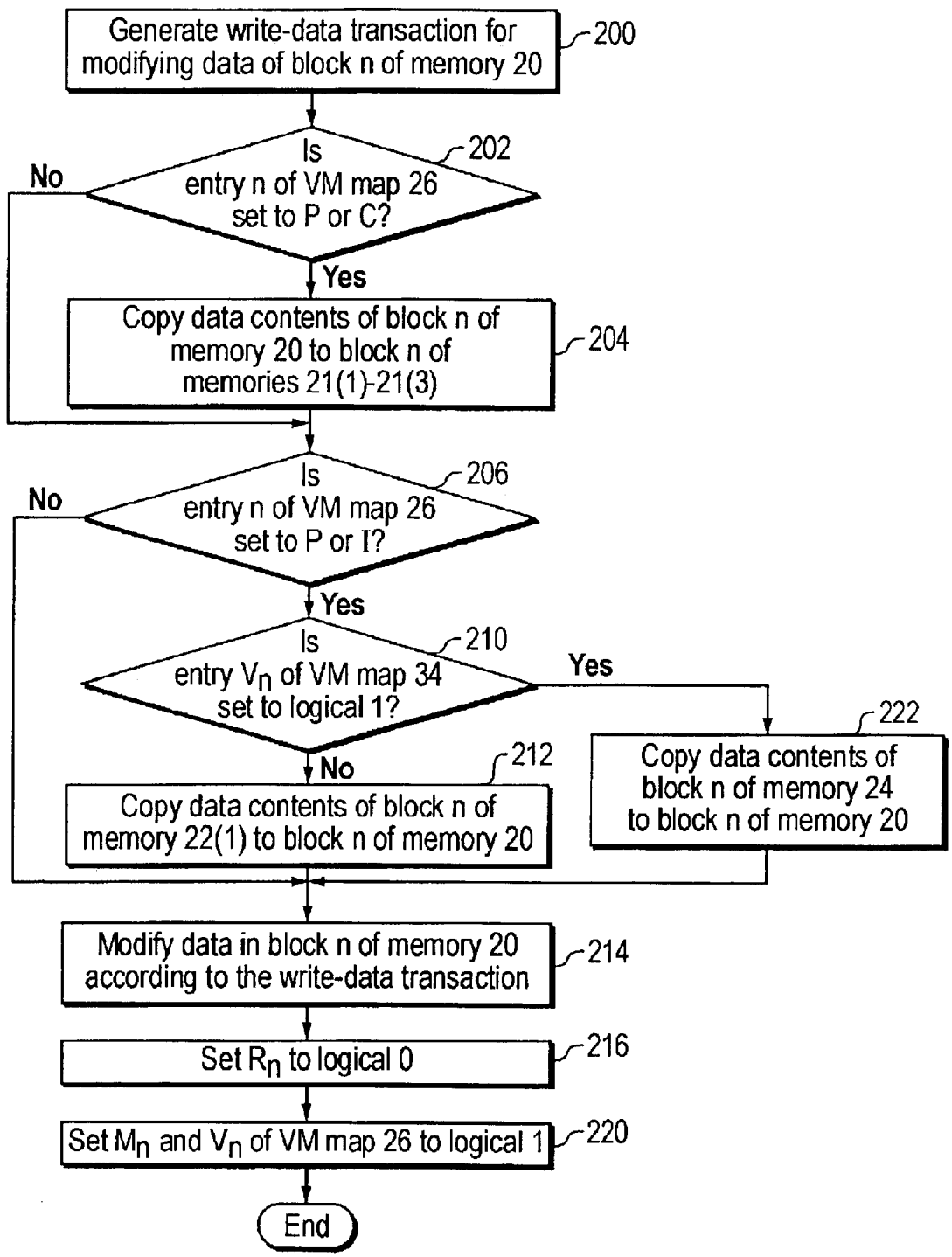
FIG. 20 is a flow chart illustrating operational aspects of writing of modifying data of the primary data volume.
Figure 21:
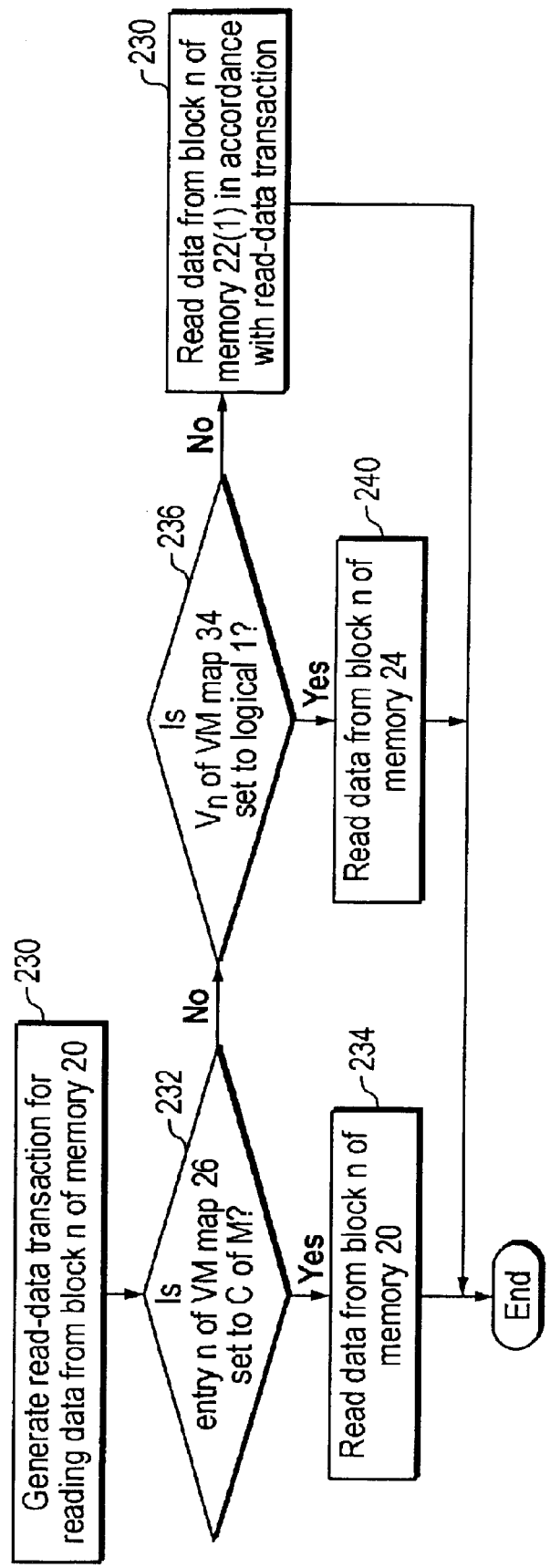
FIG. 21 is a flow chart illustrating operational aspects of reading data from the primary data volume.

In addition to the ability to host node 12 to modify data of the primary volume after the update of the VM maps according to the above equations and the process shown in FIG. 19, host node can read data of the primary data volume. FIG. 21 illustrates operational aspects of host node 12 reading data from the primary data volume. More particularly, in step 230 host node generates a read-data transaction for reading data from block n of memory 20. In response, host node accesses accumulator map 26 to determine the state of entry n therein. If entry n is set to current (C) or modified (M) then data is read from block n of memory 20 as shown in step 234. If in step 232 entry n is not set to C or M, the process proceeds to step 236 where host node 12 accesses VM map 34 to determine the state of $V_n$ set therein. If $V_n$ is set to logical 1, host node 12 reads data from block n of memory 24 in accordance with the read data transaction generated in step 30. If, however, $V_n$ of VM map 34 is set to logical 0 in step 36, host node 12 reads data from block n of memory 22(1) in accordance with the read data transaction generated in step 230.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

We claim:

1. A method comprising:

creating a primary data volume in a first memory;

creating a virtual point-in-time (PIT) copy of the primary data volume, wherein creating the virtual PIT copy comprises creating first, second and third maps in a map memory;

wherein each of the first, second, and third maps comprises a plurality of multi-bit entries;

wherein each of the entries of the first and second maps corresponds to a respective memory region of the first memory;

and wherein each of the entries of the third map corresponds to a respective memory region of a second memory for storing data of the virtual PIT copy.

2. The method of claim 1:

wherein each entry of the first, second, and third maps comprises first and second bits;

wherein the first bit of each first map entry indicates whether its respective region of the first memory contains valid data of the primary data volume;

wherein the second bit of each first map entry indicates whether its respective region of the first memory contains data that was modified since the creation of the first map;

wherein the first bit of each third map entry indicates whether its respective region of the second memory contains valid data of the virtual PIT copy;

wherein the second bit of each third map entry indicates whether its respective region of the second memory contains data that was modified since the creation of the third map.

3. The method of claim 2 further comprising:

generating a first write-data transaction that, when completed, results in modification of first data of the primary data volume;

copying the first data from the first memory to the second memory before the first data is modified;

switching the state of one of the first bits of the third map in response to copying the first data from the first memory to the second memory;

modifying the first data of the primary data volume;

switching the state of one of the second bits of the first map in response to generating the first write-data transaction.

4. The method of claim 3 further comprising:

creating a second virtual PIT copy of the primary data volume, wherein creating the second virtual PIT copy comprises creating a fourth map in memory;

wherein entries of the fourth map corresponds to respective memory regions of a third memory.

5. The method of claim 4:

wherein each entry of fourth map comprises first and second bits;

wherein the first bit of each fourth map entry indicates whether its respective region of the third memory contains valid data of the second virtual PIT copy;

wherein the second bit of each fourth map entry indicates whether its respective region of the third memory contains data that was modified since the creation of the fourth map.

6. The method of claim 5 further comprising copying the contents of the first map into the third map.

7. The method of claim 6 further comprising switching the state of a plurality of second bits of the first map after the contents of the first map is copied into the third map so that the state of all second bits of the first map are equal.

8. The method of claim 7 further comprising:
generating a second write-data transaction that, when completed, results in modification of second data of the primary data volume;
copying the second data from the first memory to the second and third memories before the second data is modified;
switching the state of one of the first bits of the fourth map in response to copying the second data from the first memory to the third memory;
switching the state of another of the first bits of the third map in response to copying the second data from the first memory to the second memory;
modifying the second data of the primary data volume;
switching the state of another of the second bits of the first map in response to generating the first write-data transaction.

9. A computer readable medium for storing instructions executable by a computer system, wherein the computer system implements a method in response to executing the instructions, the method comprising:
creating a primary data volume in a first memory;
creating a virtual point-in-time (PIT) copy of the data volume, wherein creating the virtual PIT copy comprises creating first, second and third maps in a map memory;
wherein each of the first, second, and third maps comprises a plurality of multi-bit entries;
wherein each of the entries of the first and second maps corresponds to a respective memory region of the first memory;
and wherein each of the entries of the third map corresponds to a respective memory region of a second memory for storing data of the virtual PIT copy.

10. The computer readable medium of claim 9:
wherein each entry of the first, second, and third maps comprises first and second bits;
wherein the first bit of each first map entry indicates whether its respective region of the first memory contains valid data of the primary data volume;
wherein the second bit of each first map entry indicates whether its respective region of the first memory contains data that was modified since the creation of the first map;
wherein the first bit of each third map entry indicates whether its respective region of the second memory contains valid data of the virtual PIT copy;
wherein the second bit of each third map entry indicates whether its respective region of the second memory contains data that was modified since the creation of the third map.

11. The computer readable medium of claim 10 wherein the method further comprises:
generating a first write-data transaction that, when completed, results in modification of first data of the primary data volume;
copying the first data from the first memory to the second memory before the first data is modified;
switching the state of one of the first bits of the third map in response to copying the first data from the first memory to the second memory;
modifying the first data of the primary data volume;
switching the state of one of the second bits of the first map in response to generating the first write-data transaction.

12. The computer readable medium of claim 11 wherein the method further comprises:
creating a second virtual PIT copy of the primary data volume, wherein creating the second virtual PIT copy comprises creating a fourth map in memory;
wherein entries of the fourth map corresponds to respective memory regions of a third memory.

13. The computer readable medium of claim 12:
wherein each entry of fourth map comprises first and second bits;
wherein the first bit of each fourth map entry indicates whether its respective region of the third memory contains valid data of the second virtual PIT copy;
wherein the second bit of each fourth map entry indicates whether its respective region of the third memory contains data that was modified since the creation of the fourth map.

14. The computer readable medium of claim 13 wherein the method further comprises copying the contents of the first map into the third map.

15. The computer readable medium of claim 14 wherein the method further comprises switching the state of a plurality of second bits of the first map after the contents of the first map is copied into the third map so that the state of all second bits of the first map are equal.

16. The computer readable medium of claim 15 wherein the method further comprises:
generating a second write-data transaction that, when completed, results in modification of second data of the primary data volume;
copying the second data from the first memory to the second and third memories before the second data is modified;
switching the state of one of the first bits of the fourth map in response to copying the second data from the first memory to the third memory;
switching the state of another of the first bits of the third map in response to copying the second data from the first memory to the second memory;
modifying the second data of the primary data volume;
switching the state of another of the second bits of the first map in response to generating the first write-data transaction.

17. A circuit comprising:
a first sub-circuit for creating a primary data volume in a first memory;
a second sub-circuit for creating a virtual point-in-time (PIT) copy of the primary data volume by creating first, second and third maps in a map memory;
wherein each of the first, second, and third maps comprises a plurality of multi-bit entries;
wherein each of the entries of the first and second maps corresponds to a respective memory region of the first memory;
and wherein each of the entries of the third map corresponds to a respective memory region of a second memory for storing data of the virtual PIT copy.

18. An apparatus comprising:
a first memory for storing a primary data volume;
a second memory;
a computer system in data communication with the first and second memories, the computer system comprising a computer readable medium for storing instructions executable by the computer system, wherein the computer system implements a method in response to executing the instructions, the method comprising:

creating the primary data volume in the first memory;

creating a virtual point-in-time (PIT) copy of the primary data volume, wherein creating the virtual PIT copy comprises creating first, second and third maps in a map memory, wherein each of the first, second, and third maps comprises a plurality of multi-bit entries;

wherein each of the entries of the first and second maps corresponds to a respective memory region of the first memory;

and wherein each of the entries of the third map corresponds to a respective memory region of a second memory for storing data of the virtual PIT copy.

19. A method comprising:

creating a primary data volume in a primary memory;

creating a first virtual PIT copy of the primary data volume, wherein creating the first virtual PIT copy comprises creating first and second multi-bit entry maps in a map memory;

wherein each of the entries of the first map corresponds to a respective memory region of the primary memory;

wherein each of the entries of the second map corresponds to a respective memory region of a first memory for storing data of the first virtual PIT copy;

creating a second virtual point-in-time (PIT) copy of the primary data volume, wherein creating the second virtual PIT copy comprises creating a third multi-bit map in memory;

wherein each of the entries of the third map corresponds to a respective memory region of the primary memory.

20. The method of claim 19 further comprising:

copying first data from the primary memory to the first memory, wherein the first data is copied before the second virtual PIT copy is created;

switching the state of a bit in the second map to indicate that the first data has been copied to the first memory;

modifying the first data in the primary memory after the first data is copied to the first memory;

switching the state of a bit in the first map to indicate that the first data in the primary memory has been modified;

copying the data contents of the first map to the third map after switching the state of the bit in the first map;

switching the state of the bit in the first map after copying the data contents of the first map to the third map.

21. A computer readable medium for storing instructions executable by a computer system, wherein the computer system implements a method in response to executing the instructions, the method comprising:

creating a primary data volume in a primary memory;

creating a first virtual PIT copy of the primary data volume, wherein creating the first virtual PIT copy comprises creating first and second multi-bit entry maps in a map memory;

wherein each of the entries of the first map corresponds to a respective memory region of the primary memory;

wherein each of the entries of the second map corresponds to a respective memory region of a first memory for storing data of the first virtual PIT copy;

creating a second virtual point-in-time (PIT) copy of the primary data volume, wherein creating the second virtual PIT copy comprises creating a third multi-bit map in memory;

wherein each of the entries of the third map corresponds to a respective memory region of the primary memory.

22. The computer readable medium of claim 21 wherein the method further comprises:

copying first data from the primary memory to the first memory, wherein the first data is copied before the second virtual PIT copy is created;

switching the state of a bit in the second map to indicate that the first data has been copied to the first memory;

modifying the first data in the primary memory after the first data is copied to the first memory;

switching the state of a bit in the first map to indicate that the first data in the primary memory has been modified;

copying the data contents of the first map to the third map after switching the state of the bit in the first map;

switching the state of the bit in the first map after copying the data contents of the first map to the third map.

* * * * *